(12) United States Patent
Stapleton

(10) Patent No.: US 10,859,070 B2
(45) Date of Patent: Dec. 8, 2020

(54) DOSING PUMP

(71) Applicant: Hamilton Sundstrand Corporation, Charlotte, NC (US)

(72) Inventor: Thomas J. Stapleton, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 540 days.

(21) Appl. No.: 14/598,756

(22) Filed: Jan. 16, 2015

(65) Prior Publication Data
US 2016/0206160 A1 Jul. 21, 2016

(51) Int. Cl.
| F04B 5/02 | (2006.01) |
| F04B 13/02 | (2006.01) |
| B64G 1/60 | (2006.01) |

(52) U.S. Cl.
CPC .................. *F04B 5/02* (2013.01); *B64G 1/60* (2013.01); *F04B 13/02* (2013.01)

(58) Field of Classification Search
CPC ... B64G 1/60; F04B 5/02; F04B 13/02; F04B 3/00; F04B 3/003; F04B 5/00; F04B 13/00; F04B 9/12; F04B 9/1253; F04B 19/22; F04B 23/06; B01F 13/00
USPC ............... 4/316, 459; 137/99, 240; 417/404
See application file for complete search history.

(56) References Cited

U.S. PATENT DOCUMENTS

| 3,345,997 | A | * | 10/1967 | Miller | C02F 1/686 137/101.25 |
| 3,428,535 | A |   | 2/1969 | Putnam | |
| 3,530,873 | A | * | 9/1970 | Arp | A61M 16/12 128/205.11 |
| 3,666,420 | A |   | 5/1972 | Paatzsch | |
| 4,096,835 | A | * | 6/1978 | Lamont | F02B 41/06 123/193.2 |
| 4,673,296 | A | * | 6/1987 | Sjogren | B01F 13/00 222/137 |
| 4,832,578 | A | * | 5/1989 | Putt | F04B 25/02 417/266 |
| 4,889,533 | A |   | 12/1989 | Beecher | |
| 5,146,944 | A |   | 9/1992 | Waldrum | |
| 5,599,177 | A | * | 2/1997 | Hetherington | F04B 9/133 417/429 |
| 5,785,506 | A | * | 7/1998 | Takahashi | F04B 5/02 417/366 |
| 5,885,061 | A | * | 3/1999 | Olofsson | F04B 5/02 417/258 |
| 6,024,540 | A | * | 2/2000 | Navarro Bonet | B05B 11/3023 239/321 |

(Continued)

Primary Examiner — David P Angwin
Assistant Examiner — William R Klotz
(74) Attorney, Agent, or Firm — Carlson, Gaskey & Olds, P.C.

(57) ABSTRACT

A dosing pump according to an exemplary aspect of this disclosure includes, among other things, a first chamber having an outlet fluidly coupled to a mixing area, and a second chamber having an outlet fluidly coupled to the mixing area. The dosing pump further includes a piston moveable between a suction position and a discharge position. The piston has a first head portion moveable within the first chamber, and a second head portion moveable with the second chamber. Further, movement of the piston from the suction position to the discharge position discharges fluid from the first and second chambers into the mixing area.

7 Claims, 3 Drawing Sheets

(56) References Cited

U.S. PATENT DOCUMENTS

| | | |
|---|---|---|
| 7,655,145 B1 | 2/2010 | Gormly et al. |
| 8,109,739 B2 | 2/2012 | Wrench et al. |
| 8,840,377 B2 * | 9/2014 | Leece ................. F04B 5/02 |
| | | 417/266 |
| 2003/0003006 A1 * | 1/2003 | Axelsson ............ F04B 5/02 |
| | | 417/523 |
| 2007/0286745 A1 * | 12/2007 | Chance ............ B01F 5/0685 |
| | | 417/397 |
| 2013/0318701 A1 | 12/2013 | Stapleton et al. |
| 2013/0327647 A1 | 12/2013 | Ohira et al. |
| 2014/0116939 A1 | 5/2014 | Chen et al. |

* cited by examiner

DOSING PUMP

BACKGROUND

There are three primary methods for management of liquid waste in outer space. The first solution is for the astronauts to wear diapers. Diapers are not a preferred option, especially when spending long periods of time in outer space.

The second solution is to vent the liquid waste overboard, which has been employed on the Shuttle Orbiter and other prior United States space ships. The third method is to stow the urine onboard, which has been employed in the Soviet/Russian Soyuz Spaceship and the International Space Station.

In systems where urine is collected and stored over long periods of time (sometimes referred to as "space trap urinal systems"), the urine is pretreated with a pretreatment fluid. Pretreatment of urine controls odors and microbial growth. In addition, pretreatment reduces urine precipitates from coming out of solution and, thereby, extends the time between equipment cleanings to extend the life of the urine collection equipment.

SUMMARY

A dosing pump according to an exemplary aspect of this disclosure includes, among other things, a first chamber having an outlet fluidly coupled to a mixing area, and a second chamber having an outlet fluidly coupled to the mixing area. The dosing pump further includes a piston moveable between a suction position and a discharge position. The piston has a first head portion moveable within the first chamber, and a second head portion moveable with the second chamber. Further, movement of the piston from the suction position to the discharge position discharges fluid from the first and second chambers into the mixing area.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 3 shows a piston in both a suction position (right-hand side of FIG. 3) and a discharge position (the left-hand side of FIG. 3).

DETAILED DESCRIPTION

This disclosure relates to a dosing pump, which in one example is used with a waste containment system. In that example, the dosing pump is configured to mix a pretreatment fluid and a diluent fluid to provide a particular dose of diluted pretreatment fluid to liquid waste.

Figure 1:
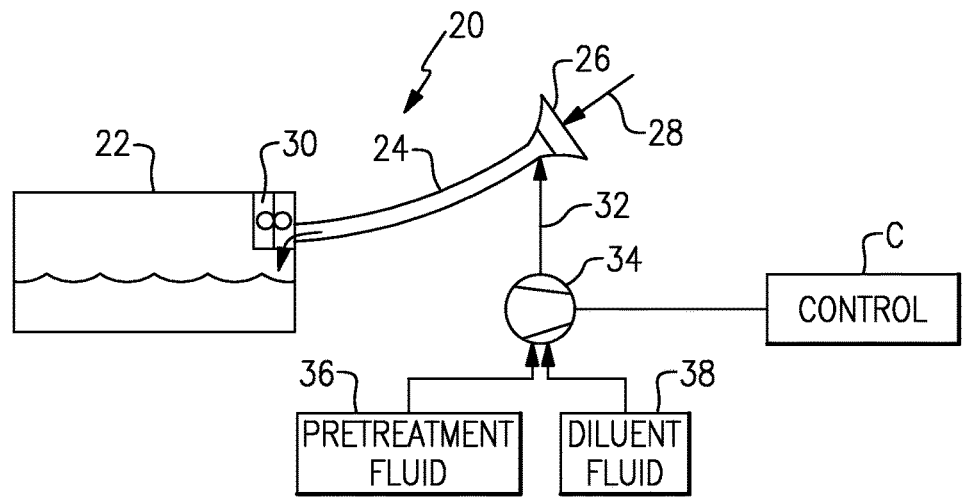
FIG. 1 schematically illustrates an example waste containment system including a dosing pump.

FIG. 1 illustrates a waste containment system 20 for use in zero gravity environments, such as on a space shuttle or space station. The containment system 20 includes a holding tank 22 in fluid communication with a hose 24. The hose 24 has an inlet 26 for accepting liquid waste 28, such as urine. The holding tank 22, in this example, includes a fan assembly 30, which includes a fan driven by a motor, to draw the liquid waste 28 into the holding tank 22.

In this example, as liquid waste 28 is drawn into the holding tank 22 via the hose 24, a dose of diluted pretreatment fluid 32 is introduced into the hose 24 and mixed with the liquid waste 28. The dose of diluted pretreatment fluid 32 is discharged from a dosing (or metering) pump 34. The dose of diluted pretreatment fluid 32 may be introduced into the liquid waste 28 at a location other than the hose 24, such as directly into the holding tank 22.

The dosing pump 34 is in fluid communication with (i.e., fluidly coupled to) a source of pretreatment fluid 36 and a source of diluent fluid 38. As will be explained in detail below, the dosing pump 34 is configured to mix the pretreatment fluid 36 and the diluent fluid 38 and provide a particular dose of diluted pretreatment fluid 32 to the liquid waste 28. In this example, the diluent fluid 38 may be water. Further, in this example, the pretreatment fluid 36 may a type of acid or another type of fluid configured to treat urine.

Figure 2:
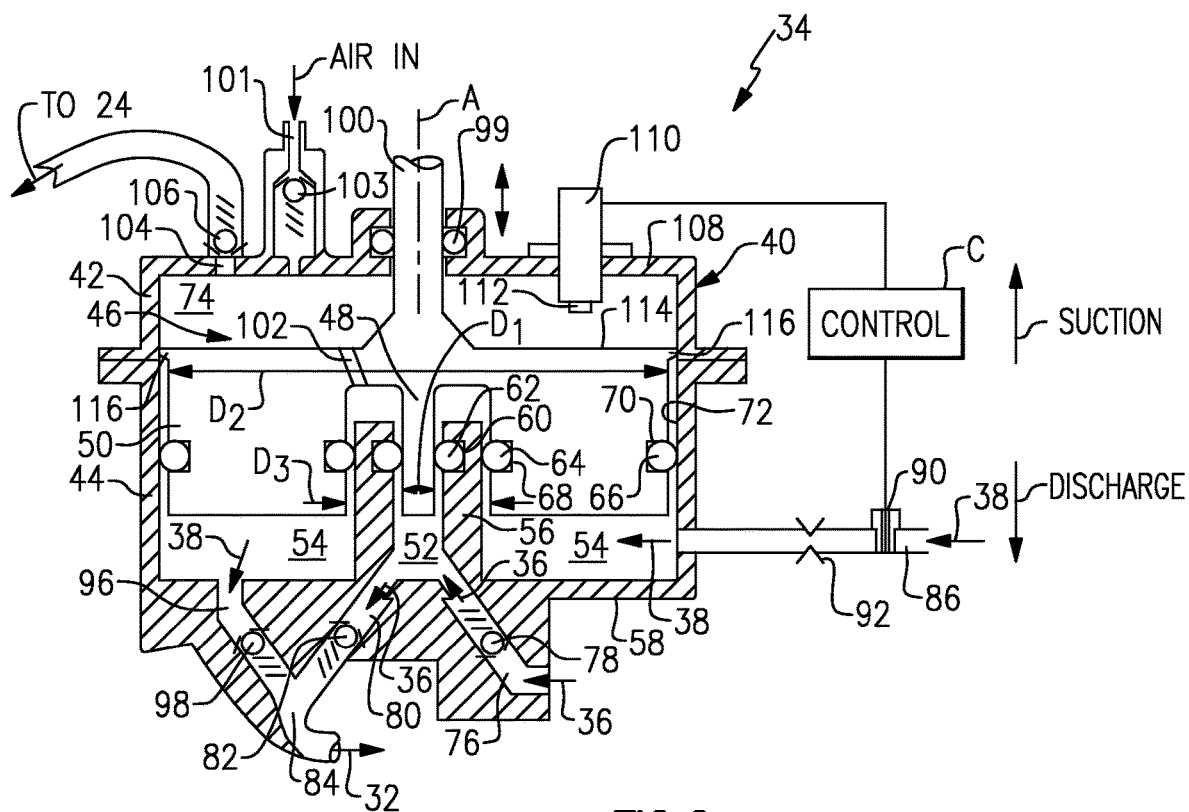
FIG. 2 is a cross-sectional view of a first example dosing pump.

In one example, the dosing pump 34 is automatically operated by way of a controller C. As will be appreciated from the below, the controller C may be in electrical communication with the various components of the dosing pump 34, and may also be in communication with an actuator configured to selectively move the piston 46 by way of the actuating shaft (FIG. 2). Alternatively, the dosing pump 34 may be manually operated by a user manipulating an actuation mechanism, such as a lever, as an example.

Typically, the liquid waste 28 will be urine. Urine contains about 96 percent water and about 4 percent solids in solution. About half of the solids consist of urea, or $CO(NH_2)_2$, while the remainder of the solids include chloride, sodium, potassium, nitrogen, ketosteroids, phosphate, sulfur, ammonia, creatinine, and uric acid. The dose of diluted pretreatment fluid 32 prevents the constituents of urine from decomposing and becoming contaminated with bacteria. In particular, the dose of the diluted pretreatment fluid 32 prevents solids from precipitating out of solution, which may result in the fouling of urine collection equipment. Once fouled, the urine collection equipment would require extensive cleaning.

FIG. 2 illustrates an example dosing pump 34. While a waste containment system 20 is illustrated in FIG. 1, the dosing pump 34 of this disclosure is not limited to use in systems for waste containment. Further, the dosing pump 34 is not limited to use in outer space.

In this example, the dosing pump 34 includes a cylindrical housing 40. The housing 40 need not be cylindrical in all examples. The housing 40 includes and upper portion 42 and lower portion 44 connected together by fasteners or welding, as examples.

Further, the dosing pump 34 includes a piston 46 moveable along a central axis A within the housing 40. In this example, the piston 46 includes a first head portion 48 and a second head portion 50 circumferentially surrounding the first head portion 48. In this example, both the first and second head portions 48, 50 are cylindrical, and are concentric relative to the central axis A. The piston 46 in this example is a single, contiguous body providing both the first and second head portions 48, 50.

The housing 40 and piston 46 define a first chamber 52 and a second chamber 54. The second chamber 54 is radially separated from the first chamber 52 by a flange 56. In this example, the flange 56 has cylindrical inner and outer surfaces to correspond to the shape of the first and second head portions 48, 50 of the piston 46. The flange 56 extends upward from a base 58 of the lower portion 44 of the housing 40 in this example.

The dosing pump 34 includes a plurality of seals to seal the chambers 52, 54. A radially inner surface of the flange 56 includes a seat 60 for a seal 62. The seal 62 seals against the first head portion 48 of the piston 46. The seal 62 is not arranged to travel with the piston 46, although it could be in other examples.

The second head portion 50 of the piston 46 includes an inner seal 64 and an outer seal 66 in respective seats 68, 70 formed in the radially inner and radially outer surfaces of the second head portion 50. The inner seal 64 is configured to seal against the radially outer surface of the flange 56. The outer seal 66 is configured to seal against the inner wall 72 of the housing 40. Both seals 64 and 66 are configured to travel with the piston 46 in this example. However, the seals 64 and 66 could be stationary. In that example, the seals 64, 66 would be seated in the radially outer surface of the flange 56 and the inner surface of the housing 4, respectively.

Together, the seals 62, 64, and 66 provide a seal between an air chamber 74 above (relative to FIG. 2) the piston 46. It should be understood that the seals 62, 64, 66 may be known types of seals, such as O-rings, and may be made from an appropriate material, such as rubber. Additionally, redundant seals may be added, if desired.

The piston 46 is configured to move up and down (relative to FIG. 2) between a "suction" position and a "discharge" position. As the piston 46 moves to the suction position, pretreatment fluid 36 and diluent fluid 38 are drawn into the chambers 52, 54, respectively. That fluid is expelled from the chambers 52, 54 as the housing moves to the discharge position. The fluids are ultimately mixed downstream of the chambers 52, 54 to provide the dose of diluted pretreatment fluid 32 from a single stroke of the piston 46. The dosing pump 34 and, in particular, the housing 40 includes a series of passageways and valves to facilitate this mixture of fluids. Two example arrangements are discussed herein.

In the example of FIG. 2, the housing 40 includes an inlet passageway 76 in fluid communication with the source of pretreatment fluid 36. The inlet passageway 76 includes an inlet check valve 78, which allows the pretreatment fluid 36 to flow toward the first chamber 52 and prevent backflow of pretreatment fluid 36 toward the inlet passageway 76. This disclosure illustrates several check valves schematically. These check valves may be any known type of valve allowing flow in one direction only.

Downstream of the inlet check valve 78, the pretreatment fluid 36 enters the first chamber 52. From the first chamber 52, the housing 40 includes an outlet passageway 80, downstream of which is an outlet check valve 82 configured to allow flow of pretreatment fluid 36 into a mixing area 84 and prevent backflow of pretreatment fluid toward the first chamber 52.

The second chamber 54, in this example, is in communication with the source of diluent fluid 38. In this example, the diluent fluid 38 is pressurized in order to assist the upward (relative to FIG. 2) movement of the piston 46 to the suction positon. In one example, the diluent fluid 38 is pressurized to 30 psi (about 206 kPa) while the pretreatment fluid 36 is at atmospheric pressure, or about 14.6 psi (about 101.3 kPa). In another example, the diluent fluid 38 is not pressurized, and instead the pretreatment fluid 36 is pressurized.

In this example, the housing 40 includes an inlet 86 passageway in fluid communication with the source of diluent fluid 38. In this example, the inlet passageway 86 includes an electromechanical fluid shutoff valve 90 upstream of the metering orifice 92. The shutoff valve 90 may be in communication with the controller C, and may be selectively actuated to introduce the pressurized diluent fluid 38 into the second chamber 54. The metering orifice 92 has a restricted diameter relative to the remainder of the inlet passageway 86. The diameter of the metering orifice 92 is selected to provide resistance to the diluent fluid 38, as needed, in order to slowly drive the piston 46 when flow is reduced.

The second chamber 54 is further in communication with an outlet passageway 96, downstream of which is an outlet check valve 98 allowing fluid to flow from the second chamber 54 into the mixing area 84, and preventing backflow of the fluid 38 into the second chamber 54.

As the piston 46 moves upward (relative to FIG. 2) toward the suction position, the fluids 36, 38 are drawn into the first and second chambers 52, 54, respectively. As mentioned, the diluent fluid 38 may be pressurized, which drives the piston 46 upward. When the piston 46 reaches the suction position (e.g., when the piston 46 engages the limit switch 110, discussed below), the piston may remain at rest in the suction position, at which point the first and second chambers 52, 54 are full of fluid. Prior to or during urination, a user (e.g., a crew member) may actuate a lever that drives the piston 46 moves downward via a shaft 100, toward the discharge position. When moving to the discharge position, the fluids from the chambers 52, 54 are discharged into the mixing area 84, where they mix together, and are ultimately discharged as the dose of diluted pretreatment fluid 32. After discharging, the piston 46 may return to the suction position under the pressure of the diluent fluid 38, which may selectively be released into the second chamber 54 by control of one or more valves (e.g., valve 90 in FIG. 3) in the inlet passageway 86.

The dosing pump 34 is operated by selectively moving the piston 46 along the central axis A, by actuating the shaft 100, either automatically or manually. In one example, the stroke of the shaft 100 is approximately 0.5 inches (1.27 cm) along to the central axis A. Additionally, a seal 99 seated in an inner surface of the housing 40 abuts the shaft 100. The seal 99 in this example is not configured to travel with the shaft 100.

In one particular example, the first head portion 48 of the piston 46 has a diameter $D_1$ substantially smaller than an outer diameter $D_2$ of the second head portion 50. The second head portion 50 also has an inner diameter $D_3$. The first chamber 52 has a smaller volume than the second chamber 54, which is selected to provide a desired mixture of the pretreatment fluid 36 and the diluent 38. In one example, using the diameters $D_1$, $D_2$, and $D_3$ above, and using a predetermined stroke length between the suction and discharge position, a ratio of a volume of the second chamber to a volume of the first chamber is within a range of about 15 to 1 and 22 to 1. The relative size of the first and second chambers 52, 54 provides a dose of diluted pretreatment fluid 32 having a conductivity that ensures that the liquid waste 28 will be properly treated. In one example, the volume of the dose of diluted pretreatment fluid 32 is within a range of 2.2 to 5.0 cubic inches (about 36 to 82 mL).

During operation, the piston 46 includes a vent 102 to allow air from the first and second chambers into the air chamber 74. Additionally, the upper portion 108 of the housing 40 includes an inlet passageway 101 and an inlet check valve 103 to allow air to enter the air chamber 74. The air may be vented by an air outlet passageway 104, which includes a check valve 106 allowing flow of fluid to the urine hose 24. Further, the upper surface 108 of the upper portion 42 may include a limit switch 110. The limit switch 110 includes a contactor 112 configured to indicate a maximum piston stroke has been reached when engaged with the upper surface 114 of the piston 46.

Additionally, the piston 46 may include alignment features 116 to prevent the piston 46 from becoming misaligned during operation. In this example, the alignment features are adjacent the upper surface of the piston 46. The alignment features 116 project radially outward from the remainder of the radially outer surface of the piston 46.

Figure 3:
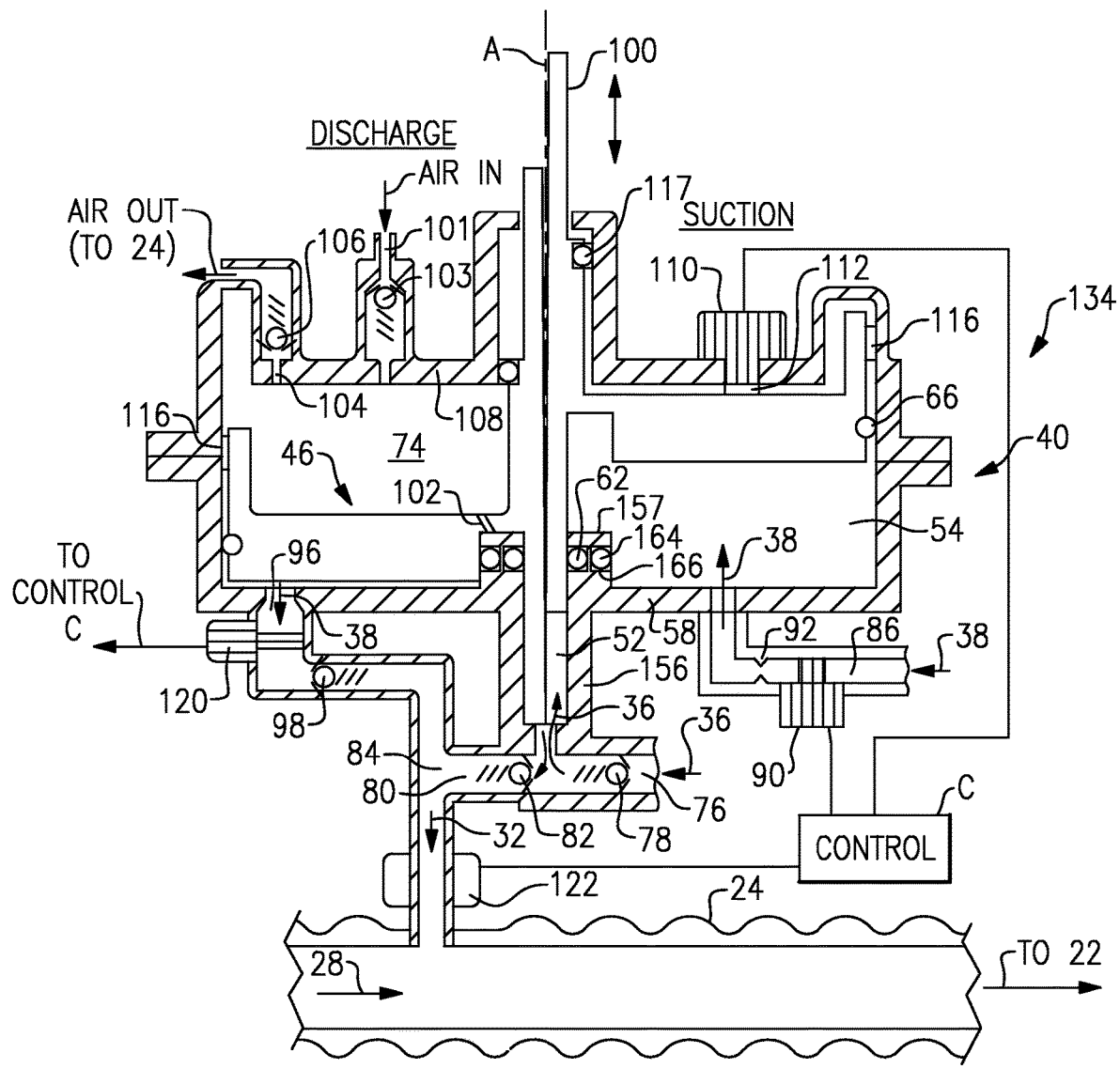
FIG. 3 is a cross-sectional view of a second example dosing pump.

FIG. 3 is another example embodiment of a dosing pump according to this disclosure. The dosing pump of FIG. 3 is referenced using numeral 134. While the dosing pump 134 is arranged differently from the dosing pump 34 of FIG. 2, like elements from the dosing pump 34 are referenced in FIG. 3 using the same numerals.

FIG. 3 illustrates the piston 46 in both a suction position and a discharge position. The suction position is illustrated on the right-hand side of FIG. 3, and the discharge position is illustrated on the left-hand side of FIG. 3. While substantially similar in operation, there are a number of differences between the dosing pumps 34 and 134. It should be understood that these differences could be incorporated into either of the illustrated pumps 34, 134.

Whereas in FIG. 2 the flange 56 defining the first chamber 52 extended upward from the base 58 of the housing 40, the flange 156 in the example of FIG. 3 projects partially downward from the base 58 of the housing 40. The flange 156 also includes a portion 157 extending upward from the base 58. Portion 157 extending upward from the base 58 supports seals 62 and 164.

Further, whereas the inner seal 64 in FIG. 2 was configured to travel with the piston 46, the inner seal 164 is mounted within a seat 166 in the upper portion 157 of the flange 156, and is thus not configured to travel with the piston 46.

The actuating shaft 100 in the example of FIG. 3 includes an seal 117 seated on an outer surface thereof, and configured to travel with the actuating shaft 100 and seal against an inner surface of the housing 40.

The outlet passageway 96 includes an electromechanical fluid shutoff valve 120 upstream of the outlet check valve 98. The shutoff valve 120 may be selectively operated to reduce the load of the pressure from the fluid 38 on the outlet check valve 98.

Additionally, in this example, downstream of the mixing area 84, the dosing pump 134 includes a conductivity sensor 122. The controller C may be in electrical communication with the conductivity sensor 122, and may be configured to determine the conductivity of the dose of the diluted pretreatment fluid 32 based on the output form the conductivity sensor 122. If the conductivity level is too low, an additional dose of diluted pretreatment fluid 32 may be provided into the hose 24. In the level is too high, a dose may be withheld.

By arranging the piston 46 relative to the first and second concentric chambers 52, 54, and by providing the seals as illustrated in FIGS. 2-3, a leak of the seal 62 would direct pretreatment fluid 36 to the air vent 102 and out to the urine hose 24. Likewise, leaks of the inner and outer seals 64, 66 (and seal 164) will also leak the diluent fluid 38 to the urine hose 24. This increases the safety of the overall system as the pretreatment fluid 36 may be toxic.

Figure 4:
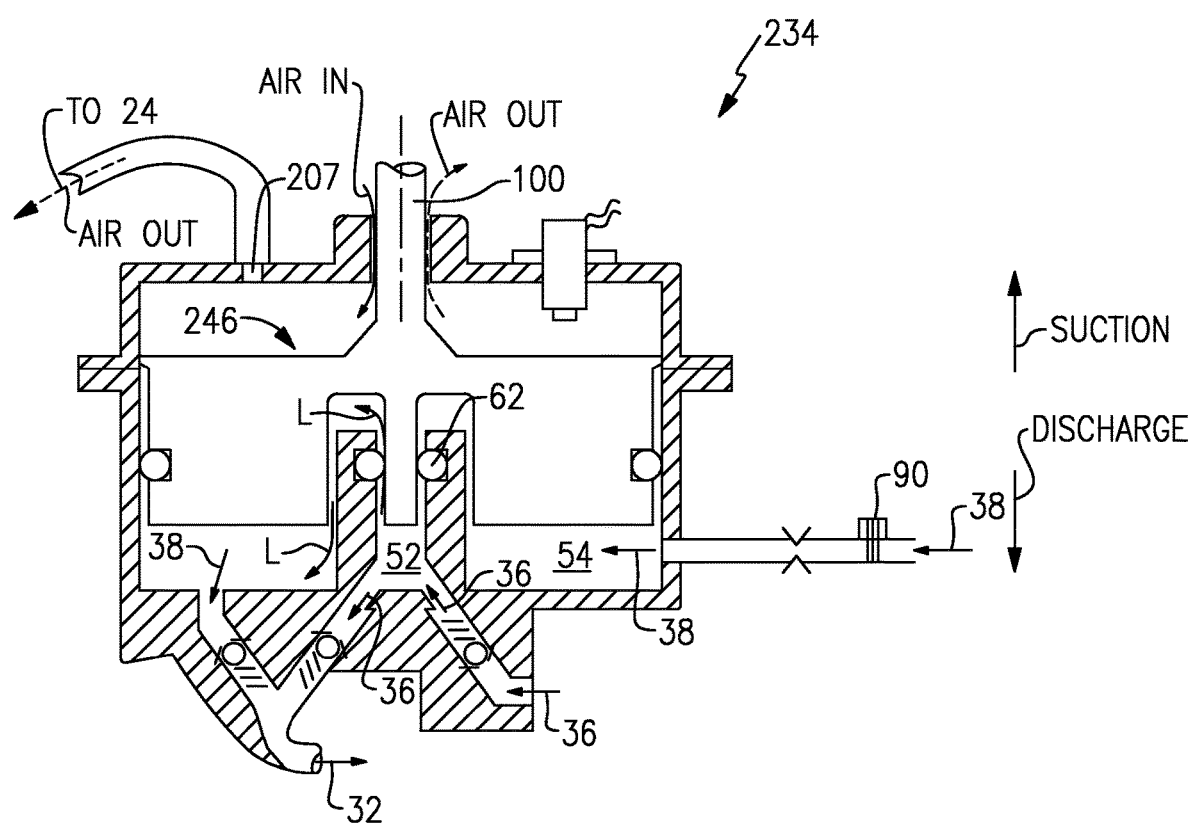
FIG. 4 is a cross-sectional view of a third example dosing pump.

In another example of this disclosure, which is illustrated in FIG. 4, the seals 64, 164 (FIGS. 2 and 3, respectively) and the air vent 102 are removed. As shown in FIG. 4, the dosing pump 234 includes a piston 246 without any air vents that would communicate fluid through the piston 246. Additionally, the air inlet and outlet passageways 101, 104 are not needed in the embodiment of FIG. 4, and instead the area above the piston may be configured to breathe freely by air flowing in-and-out around the shaft 100, which is unsealed in this example (e.g., seals like the seals 99, 117 would not be present). Alternatively, air may flow into the area above the piston around the unsealed shaft 100 and exit via a port 207 which is fluidly coupled to the hose 24 or another volume external to the dosing pump 234. Further, in the FIG. 4 arrangement, if there is a leak in the seal 62, the pretreatment fluid 36 (which, again, may be toxic) will not be allowed to directed to the hose 24 through the air outlet passageway 104 as in the prior embodiments. Instead, the leaked flow L of pretreatment fluid 36 will flow from the first chamber 52 and enter the second chamber 54. The leaked flow L may alter the dilution ratio, however the pretreatment fluid 36 will be benign because it has been allowed to enter the second chamber 54 and mix with diluent fluid 38. This arrangement protects the downstream components from being exposed to undiluted pretreatment fluid 36.

The dosing pump 34 may be operated during liquid waste evacuation, and provide a single dose of the diluted pretreatment fluid 32 into the hose 24 to treat the expected volume of liquid waste 28. One dose is provided by a single stroke of the piston 46. Alternatively, the dosing pump 34 may provide continuous or intermittent doses while liquid waste is evacuated.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A dosing pump, comprising:
   a first chamber having an outlet fluidly coupled to a mixing area;
   a second chamber having an outlet fluidly coupled to the mixing area; and
   a piston moveable between a suction position and a discharge position, the piston having a first head portion moveable within the first chamber and a second head portion moveable within the second chamber, wherein the first head portion and the second head portion are concentric, and wherein the second head portion circumferentially surrounds the first head portion, wherein a single movement of the piston from the suction position to the discharge position discharges fluid from the first and second chambers into the mixing area, wherein the piston is a single, contiguous body providing both the first and second head portions, and wherein the single movement of the piston from the suction position to the discharge position discharges fluid from the first discharge chamber directly into the mixing area and simultaneously also discharges fluid from the second chamber directly into the mixing area.

2. The dosing pump as recited in claim 1, wherein the first chamber has an inlet fluidly coupled to a source of a first fluid, and the second chamber has an inlet fluidly coupled to a source of a second fluid different than the first fluid.

3. The dosing pump as recited in claim 1, wherein the first chamber and the second chamber are concentric, and wherein the second chamber circumferentially surrounds the first chamber.

4. The dosing pump as recited in claim 1, wherein, when the piston is in the suction position, a ratio of a volume of fluid within the second chamber to a volume of fluid within the first chamber is within a range of about 15 to 1 and 22 to 1.

5. The dosing pump as recited in claim 1, wherein a radially outer surface of the piston includes alignment features projecting radially outwardly from the remainder of the radially outer surface of the piston.

6. The dosing pump as recited in claim 1, wherein the piston is without any air vents and the dosing pump includes one or more seals configured to direct a leaked flow of fluid from the first chamber to the second chamber.

7. The dosing pump as recited in claim 1, wherein the single movement of the piston from the suction position to the discharge position discharges fluid from the first discharge chamber directly into the mixing area without causing the fluid from the first discharge chamber to first pass through the second discharge chamber.

\* \* \* \* \*